(12) United States Patent
Yu

(10) Patent No.: US 6,435,684 B1
(45) Date of Patent: Aug. 20, 2002

(54) EXTERNAL SIDE VIEW MIRROR

(76) Inventor: Zu Sheng Yu, 253 Marshall Ave., West Hempstead, NY (US) 11552

( * ) Notice: Subject to any disclaimer, the term of this patent is extended or adjusted under 35 U.S.C. 154(b) by 0 days.

(21) Appl. No.: 09/659,225

(22) Filed: Sep. 11, 2000

(51) Int. Cl.[7] ............................................. G02B 7/182
(52) U.S. Cl. ........................ 359/881; 359/841; 248/480
(58) Field of Search ................................. 359/841, 871, 359/872, 881; 248/467, 475.1, 476, 480

(56) References Cited

U.S. PATENT DOCUMENTS

| | | | | |
|---|---|---|---|---|
| 2,419,306 A | * | 4/1947 | Zeiler | |
| 4,123,030 A | * | 10/1978 | Johansson | 248/478 |
| 5,039,055 A | * | 8/1991 | Lempelius | 248/480 |
| 5,483,385 A | * | 1/1996 | Boddy | 359/841 |
| 5,513,048 A | * | 4/1996 | Chen | 359/881 |
| 5,831,779 A | * | 11/1998 | Moore | 359/841 |
| 6,130,790 A | * | 10/2000 | Tu | 359/841 |

* cited by examiner

*Primary Examiner*—Mark A. Robinson
(74) *Attorney, Agent, or Firm*—F. Chau & Associates, LLP

(57) ABSTRACT

A side view mirror apparatus for providing a driver with increased visibility around a vehicle. The apparatus comprises a mirror housing having a cavity for insertion of a distal portion of a rod, the housing being rotatable about the rod. A clip is attached to the proximal portion of the rod for clipping the side view mirror apparatus to a vehicle, preferably a window edge.

20 Claims, 5 Drawing Sheets

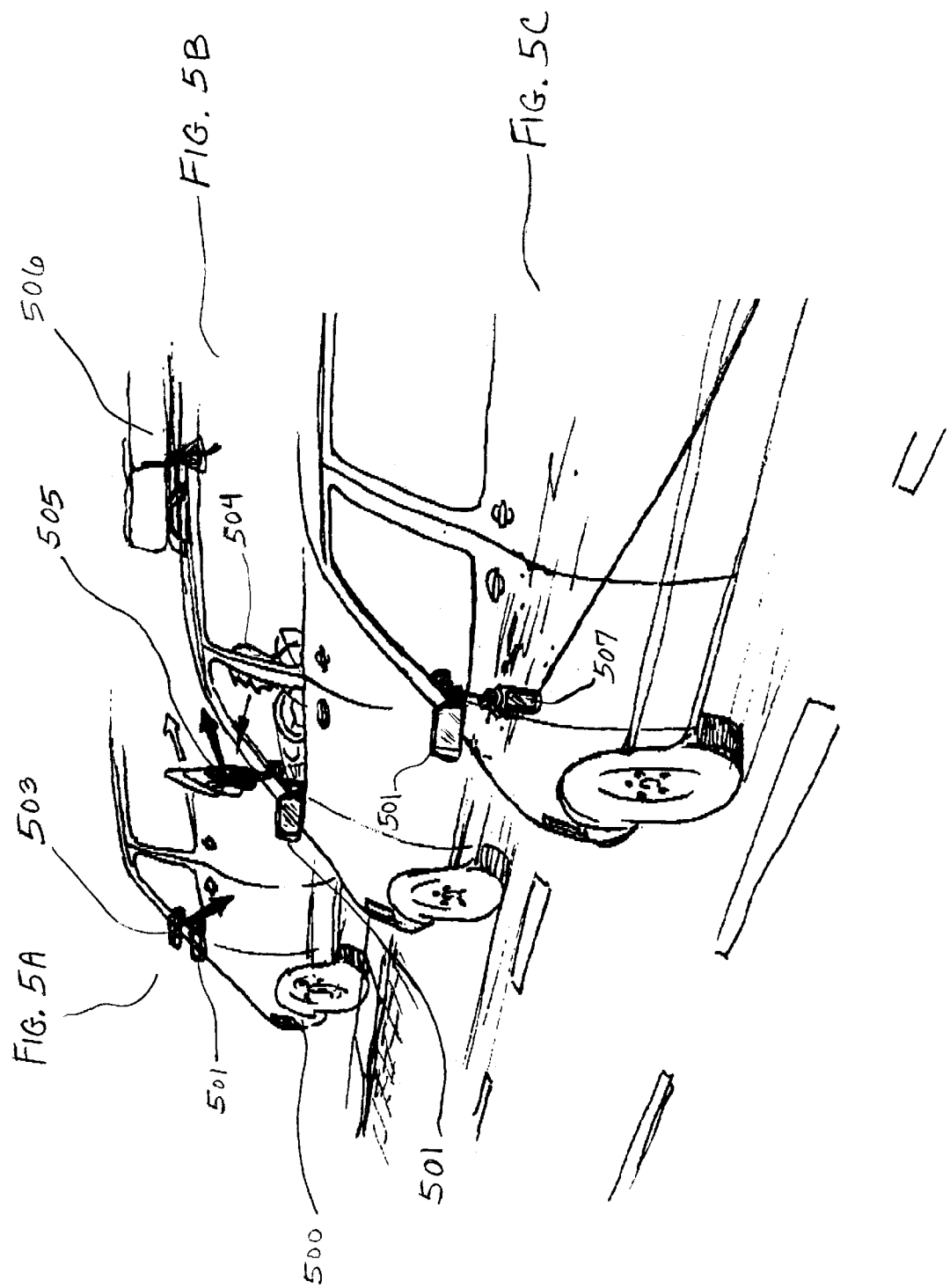

EXTERNAL SIDE VIEW MIRROR

BACKGROUND

1. Technical Field

The present invention relates generally to side view mirrors, and more specifically, to a side view mirror apparatus which is manually installable, removable, and adjustable.

2. Description of Related Art

Side view mirrors provide drivers of automobiles with an external rear side view of their vehicle, and thus are a necessity for safe driving. A disadvantage of conventional side view mirrors is their vulnerability to damage since they are permanently affixed to and protrude from the vehicle. Another disadvantage is the limited view which the mirrors provide to the driver.

As larger vehicles such as minivans and sport utility vehicles (SUVs) have boomed in popularity and sales in recent years, a safety concern arises for the driver who needs to be able to see as much as possible around these large vehicles while in the drived's seat. Indeed, the more aware the driver is of what is going on around the vehicle, the safer it is to operate. In response to this need, manufacturers have developed extra-large side view mirrors to give the driver a larger view of the sides of these vehicles. However, these extra-large mirrors necessarily protrude from the vehicle a significantly greater amount than regular-sized mirrors, and thus are even more prone to damage. Once damaged, side-view mirrors can be very costly, inconvenient, and time consuming to replace. Mirrors having degrees of concavity have also been developed to provide a larger area of visibility to the driver. However, the concavity also distorts the reflected image seen by the driver.

In addition, traditional side view mirrors are permanently affixed close to the vehicle and can only be adjusted slightly by the driver. Thus, regardless of the size of the mirror, the driver is afforded only a very limited side view and cannot see a large area of the vehicle. For example, if the vehicle is carrying items on a roof rack, the driver has no way of observing them to make sure they are still secured without stopping and exiting the vehicle. Also, the driver cannot see a large portion of the lower side of the vehicle with traditional side view mirrors. Neither regular-sized side view mirrors nor the extra-large side view mirrors mentioned above afford the driver a view of the top or lower rear side portions of the vehicle, since the distance they would have to extend from the vehicle in order to do so would render them impractical and dangerous.

Accordingly, an easily installable and removable external side view mirror that can be adjusted to provide a wide range of viewing angles including views of the top and lower rear side of the vehicle, and which can be used as an auxiliary to a traditional side view mirror, is highly desirable.

SUMMARY OF THE INVENTION

The present invention seeks to eliminate the aforesaid disadvantages and problems by providing an improved apparatus that is easily removable and installable by a vehicle driver and increases the driver's field of vision around the vehicle with its adjustment capabilities.

According to an aspect of the present invention, an improved side view mirror apparatus is provided including a mirror housing having a mirror and a housing cavity, a rod having a distal portion and a proximal portion, the distal portion movably inserted into the housing cavity, and a clip attached to a proximal portion of the rod having elastomeric pads for frictionally securing the apparatus to an edge of a vehicle window.

According to another aspect of the present invention, a connector is provided for adjustably connecting the proximal portion of the rod to the distal portion of the rod. The connector is moveably inserted into the proximal portion of the rod. A connector screw is provided for fixing the mirror housing in a desired position and to prevent movement of the mirror.

According to yet another aspect of the present invention, a screw is provided for fixing the mirror housing to the rod to prevent movement of the mirror housing.

According to yet another aspect of the present invention, the mirror housing is extendable by sliding along the distal portion of the rod.

These, and other aspects, features and advantages of the present invention will be described or become apparent from the following detailed description of the preferred embodiments, which is to be read in connection with the accompanying drawings.

BRIEF DESCRIPTION OF THE DRAWINGS

FIG. 5A is an exemplary illustration of a removable external side view mirror installed on a vehicle and adjusted to a horizontal position according to an aspect of the present invention.

FIG. 5B is an exemplary illustration of a removable external side view mirror installed on a vehicle and adjusted to an upright vertical position according to an aspect of the present invention.

FIG. 5C is an exemplary illustration of a removable external side view mirror installed on a vehicle and adjusted to a downward vertical position according to an aspect of the present invention.

DETAILED DESCRIPTION OF PREFERRED EMBODIMENTS

Figure 1:
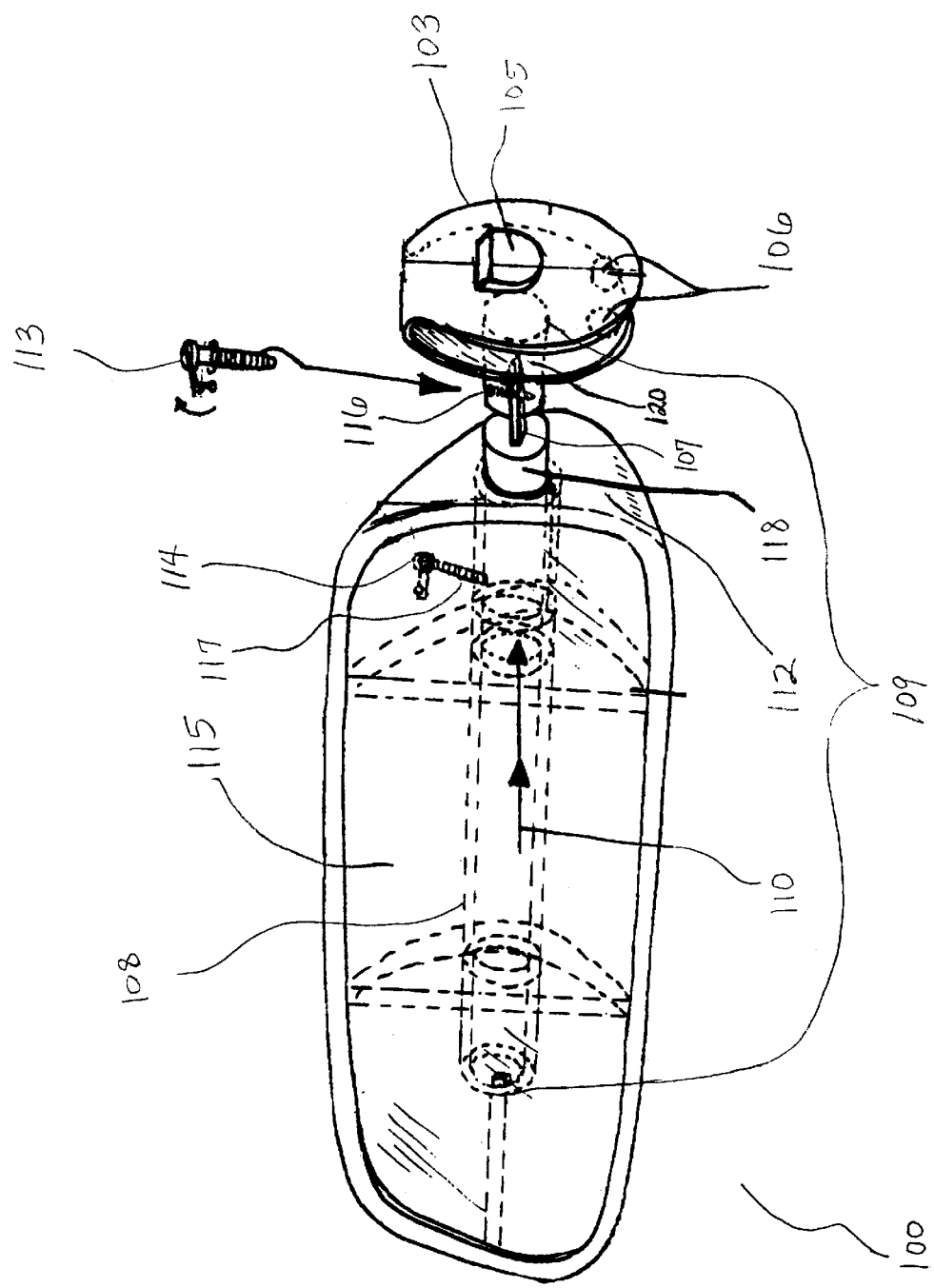
FIG. 1 is an exemplary illustration of an external side view mirror according to an embodiment of the present invention.

With reference now to the Figures, the illustration of FIG. 1 depicts an example of an external side view mirror apparatus 100 according to an aspect of the present invention. In general, side view mirror 100 comprises a clip 103 for attachment, for example, onto an edge of a vehicle window. The clip is preferably metallic, but can comprise any rigid material. The clip includes elastomeric pads 106 on its interior surface for frictionally holding the clip against the window glass and for absorbing any vibration produced by the vehicle. The clip also includes an external bump 105 for preventing the clip from slipping through a closed window when secured on the window edge.

An elongated member or a rod 109 having a proximal portion 120 and a distal portion 118 attaches the clip 103 to mirror housing 112, which houses a mirror 115. A first end of the proximal portion 120 is fixedly attached to the clip 103. A connector 107 adjustably connects a second end of the proximal portion of the rod to the distal portion 118 of the rod. The distal portion 120 is movably attached to the mirror housing by insertion into a housing cavity 108. The housing cavity is an elongated cylindrical opening passing laterally through the mirror housing 112 and being of sufficient diameter and depth to receive the distal portion of the rod. The rod facilitates rotation of the mirror housing 360° within the housing cavity 108 about a longitudinal axis 110 defined by the rod for providing the vehicle's driver with a multitude of viewing directions.

In addition, the mirror housing 112 can be axially extended by sliding along the distal portion of the rod 109. This capability to extend the mirror increases the driver's field of vision around the vehicle. A housing screw 117 can be used to secure the mirror housing with the rod, preventing the housing from rotating relative to the rod or sliding along the distal portion of the rod. In this way, the mirror housing can be secured once a desired position is reached. A housing hole 114 facilitates a screw 117 by allowing frictional contact with the distal portion of rod 109.

Preferably, the connector 107 can be movably inserted into the proximal portion of the rod to facilitate adjustment of the distal portion of rod 109 in varying degrees. The connector can be fixedly held to the proximal portion of the rod by a connector screw 113 inserted into a hole 116 when a desired position is reached to prevent any further movement of the connector. For example, the connector screw can be inserted completely through the connector 107. In this way, the position of the mirror can be adjusted and fixed in a desired position to provide the driver with additional views of the vehicle, such as the roof top or bottom rear side of the vehicle.

Figure 2:
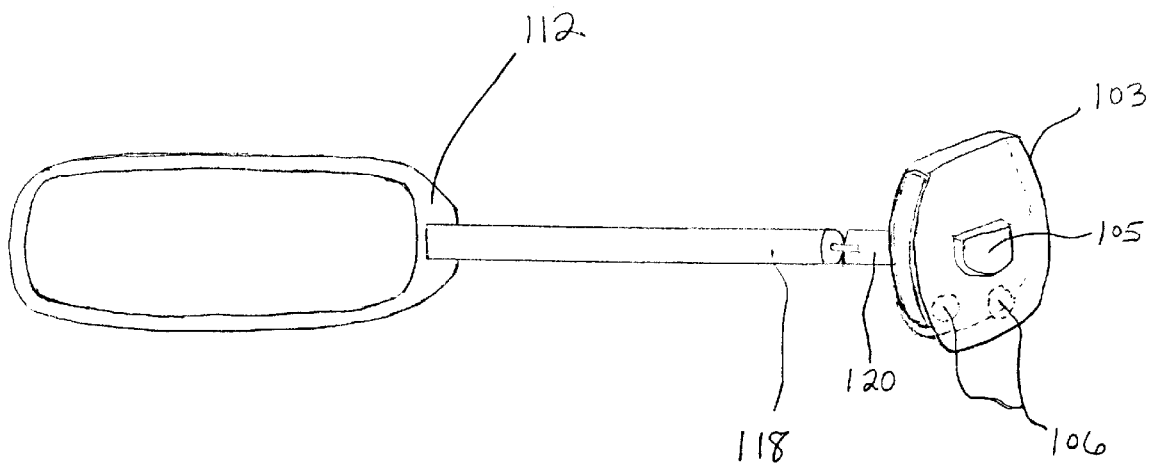
FIG. 2 is an exemplary illustration of an extended position of an external side view mirror according to an aspect of the present invention.

FIG. 2 is an exemplary illustration of the side mirror apparatus 100 in an extended position. While in an extended position, mirror housing 112 can also be rotated 360° relative to the longitudinal axis 110.

Figure 3:
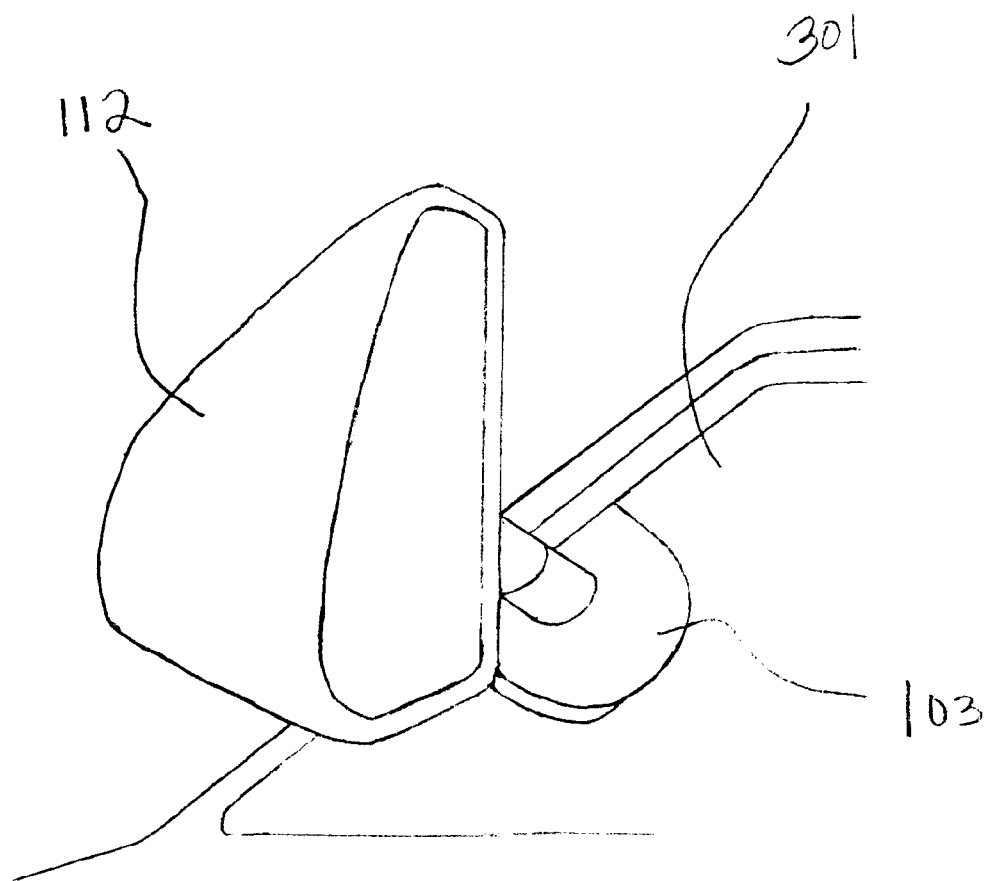
FIG. 3 is an exemplary illustration of an external side view mirror mounted to a vehicle window according to an embodiment of the present invention.

FIG. 3 is an exemplary illustration of side mirror apparatus 100 mounted on a vehicle window according to an embodiment of the present invention. Mirror housing 112 is shown in a horizontal position with clip 103 secured to the edge of window 301.

Figure 4:
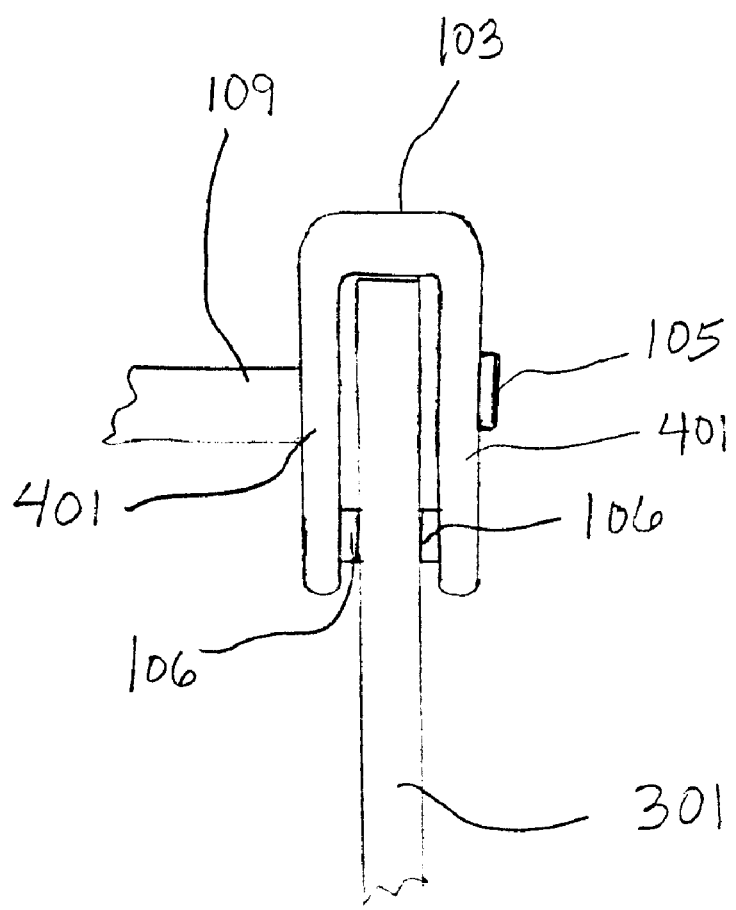
FIG. 4 is an exemplary illustration of a side view of a mounted clip according to an aspect of the present invention.

FIG. 4 depicts an example of a side view of a mounted clip according to an aspect of the present invention. Lateral sides 401 of clip 103 are positioned parallel to either side of the top edge of window 301 in the mounted position. The elastomeric pads 106 attached to the clip make frictional contact with the sides of window 301 to hold the clip in place and also to absorb vibrations from the vehicle.

FIGS. 5A, 5B and 5C are exemplary illustrations depicting a vehicle 500 equipped with a removable external side view mirror in 3 different adjustments, mounted as an auxiliary mirror to a permanent non-removable side mirror 501 according to an embodiment of the present invention.

For example, in FIG. 5A, removable external side mirror 503 is mounted above non-removable mirror 501 and is adjusted to a horizontal position relative to the ground. This provides a driver with a more extensive view of the side of the vehicle. In FIG. 5B, upward-positioned removable side mirror 505 is adjusted to an upwards-pointing vertical position 90° from the original horizontal position. This enables the driver 504 to see the roof of the vehicle, including any items 506 strapped to the roof. In FIG. 5C, downward-positioned removable side mirror 507 is adjusted to a downwards-pointing direction 90° below the horizontal. This position affords the driver additional views of the lower rear side portions of the vehicle.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the present invention.

What is claimed is:

1. A side view mirror apparatus comprising:
a mirror housing having a mirror and a housing cavity;
a rod having a proximal portion and a distal portion, said distal portion for insertion into said housing cavity and facilitating rotational movement of said mirror housing about said rod, wherein a connector is provided for adjustably connecting said proximal portion of the rod to said distal portion of the rod, said connector being moveably inserted into the proximal portion of the rod; and
a clip attached to the proximal portion of said rod, the clip for clipping said side view mirror apparatus to a vehicle.

2. The apparatus of claim 1, wherein the clip includes a plurality of elastomeric pads for frictionally securing said clip to an edge of a vehicle window.

3. The apparatus of claim 2, wherein the clip includes an external bump for preventing said clip from slipping through a closed window.

4. The apparatus of claim 1, further including fixing means for fixing the mirror housing to the rod to prevent movement of the mirror housing when the mirror housing is in a desired position.

5. The apparatus of claim 4, wherein said fixing means is a screw.

6. The apparatus of claim 1, wherein said mirror housing is extendable by sliding said mirror housing along the distal portion of the rod.

7. The apparatus of claim 1, further including fixing means for fixing said connector to said rod to prevent movement of the connector.

8. The apparatus of claim 7, wherein said fixing means is a connector screw.

9. The apparatus of claim 1, wherein the clip secures the side view mirror apparatus to an edge of a vehicle window.

10. The apparatus of claim 1, wherein the connector is moveably inserted into the distal portion of the rod.

11. The apparatus of claim 1, wherein a face of the mirror is substantially parallel to a length of the rod.

12. An apparatus comprising:
a housing member having a mirror and a cavity;
an elongated member having a first end and a second end, said second end for insertion into said cavity and facilitating rotation of said housing member about said elongated member, wherein a connector is provided for adjustably connecting said first end of the elongated member to said second end of the elongated member, the connector being moveably inserted into the first end and the second end of the elongated member; and
a fastening member attached to the first end of said elongated member, the fastening member for securing said apparatus to an object.

13. The apparatus of claim 12, wherein the fastening member includes a plurality of elastomeric pads for frictionally securing the fastening member to the object.

14. The apparatus of claim 12, wherein the housing member is extendable by sliding out along the second end of the elongated member.

15. The apparatus of claim 12, wherein the object is an edge of a vehicle window.

16. The apparatus of claim 12, further including fixing means for fixing said connector to said elongated member to prevent movement of the connector when the connector is in a desired position.

17. The apparatus of claim 16, wherein said fixing means is a connector screw.

18. The apparatus of claim 12, further including fixing means for fixing the housing member to the elongated member to prevent movement of the housing member when the housing member is in a desired position.

19. The apparatus of claim 18, wherein said fixing means is a screw.

20. The apparatus of claim 12, wherein a face of the mirror is substantially parallel to a length of the elongated member.

* * * * *